June 11, 1940.  W. J. COULTAS  2,203,981
HITCH CONNECTION
Filed Sept. 27, 1937   3 Sheets-Sheet 3
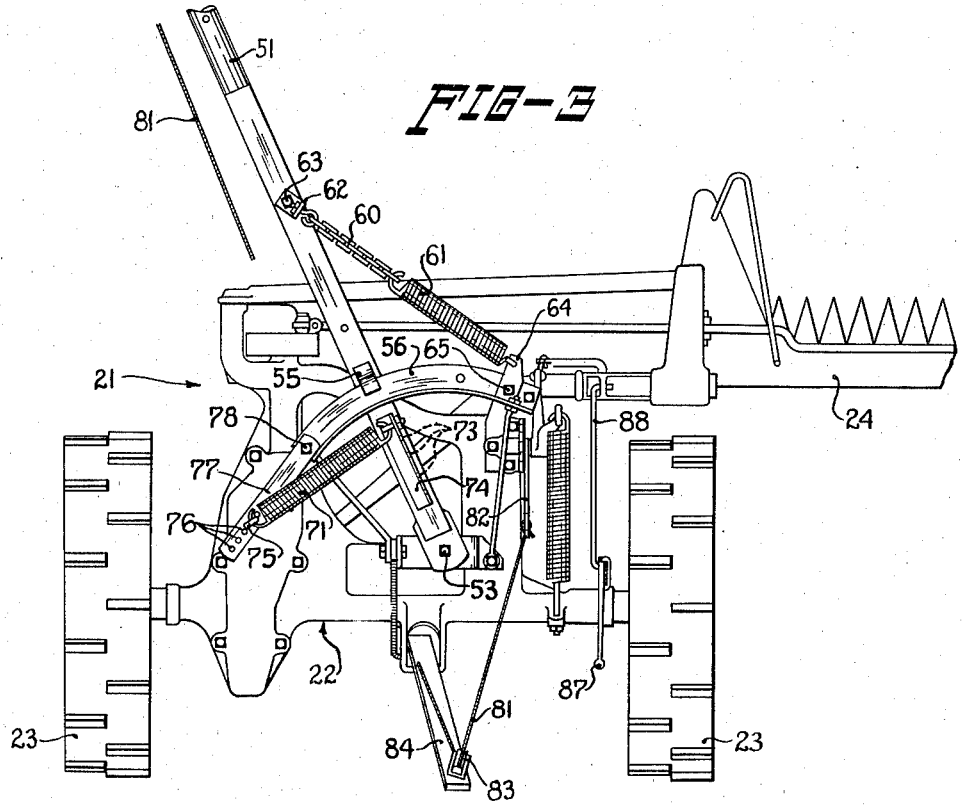
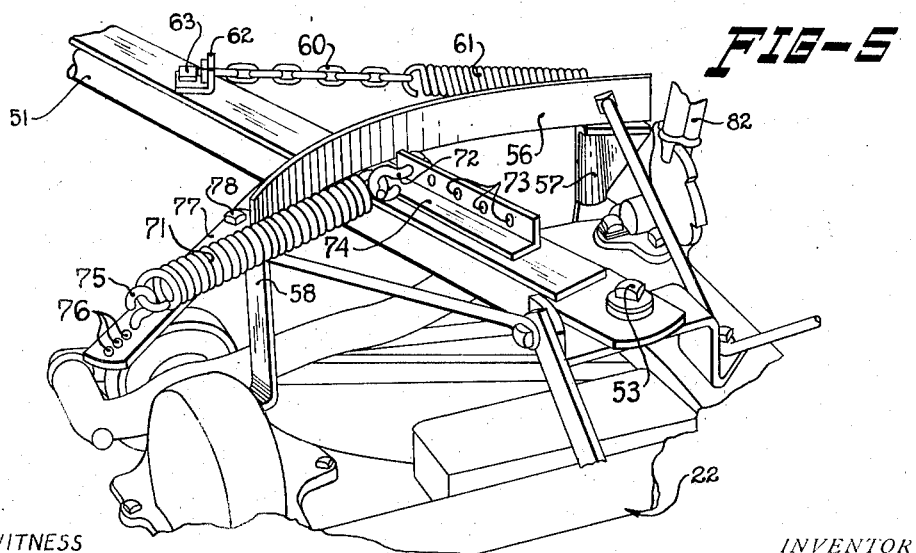
WITNESS
Norman C. Westling
INVENTOR
Wilbur J. Coultas
BY Brown, Jackson, Boettcher & Dienner
ATTORNEYS Patented June 11, 1940

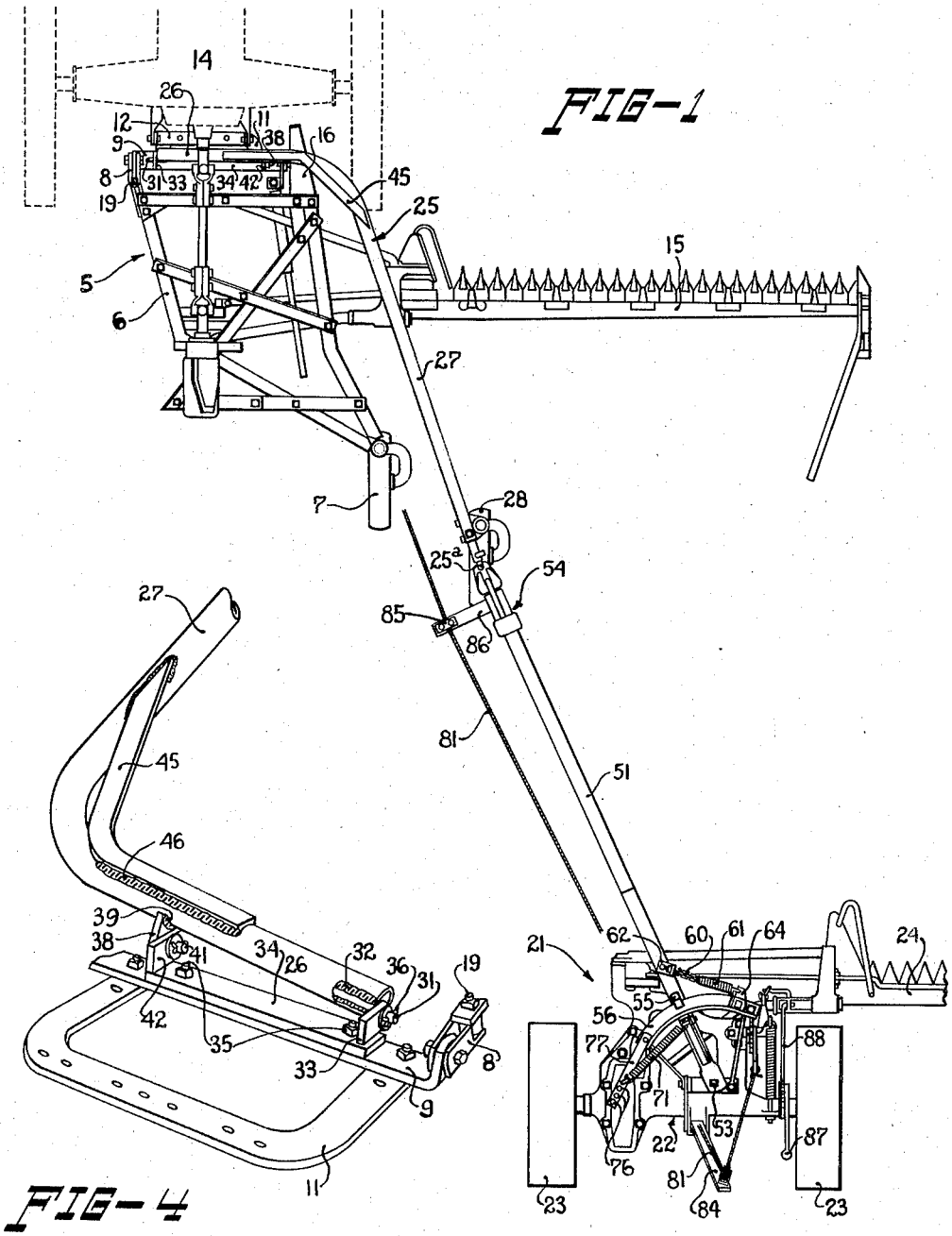

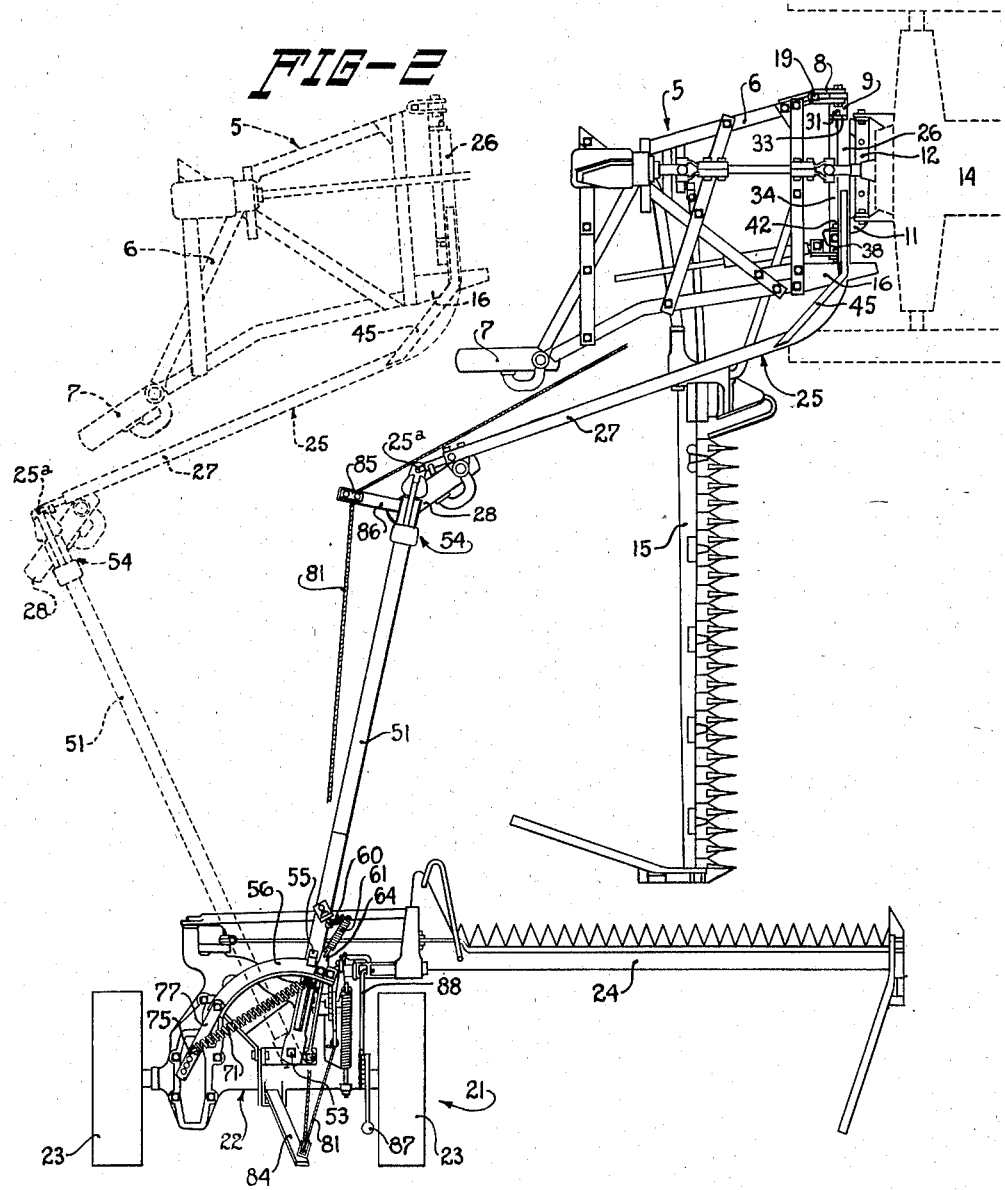

2,203,981

UNITED STATES PATENT OFFICE 2,203,981

HITCH CONNECTION

Wilbur J. Coultas, Moline, Ill., assignor to Deere & Company, Moline, Ill., a corporation of Illinois Application September 27, 1937, Serial No. 165,826

14 Claims. (Cl. 280—33.44)

The present invention relates generally to hitch connections of the type employed for connecting a trailing implement to a pulling vehicle, and more particularly is concerned with a hitch device used for connecting a trailer mower to a tractor-mounted mower whereby the trailer mower is towed in offset relation to the tractor-mounted mower so that the trailer mower will cut a swath adjoining the swath previously cut by the tractor-mounted mower to thereby double the work accomplished.

It is of course desirable in operating two such implements connected together in tandem offset relation that they turn as squarely as possible at the end of the field and at the same time complete the cutting of two full swaths so that the cutting will be uniform and no grain will be left standing at such turns due to its having passed between the cutter bars of the two mowers as they make the turn. In implements of this type the trailing mower is usually offset to the right of the tractor-mounted mower and in the ordinary operation of the machine in the field the turns at the corners of the field are made to the right so that the cutter bars of the mowers are on the inner side of the turn.

My invention has for its principal object to provide a hitch connection between a tractor-mounted mower and a trailer mower that will not only draw the trailing mower in correct relation in straight forward movement, but will also cause the trailing implement, when making a right turn at the corner of a field, to continue its forward travel as the leading implement is turning and until the trailing implement has advanced to the proper position and then to suddenly wheel around into a position at right angles in proper alinement for cutting a swath along the end of the field, whereby no grain is left standing at the corner of the field.

Another object of the present invention is to provide an improved hitch connection between the pulling implement and the trailing implement wherein only one draft connection between the two implements will be required to accomplish the fast turning movement of the trailing implement after it has reached the proper position in its forward travel after the pulling implement has turned.

A further object of the invention is to provide improved means for connecting the draft member of the trailing mower to the frame of the tractor-mounted mower whereby the tractor may be readily released from the two mowers by merely disconnecting it from the tractor-mounted mower.

Other objects and advantageous features of the present invention will be apparent from the following description of the preferred embodiment thereof taken in connection with the accompanying drawings, in which—

Figure 1 is a plan view illustrating a trailer mower connected to a tractor-mounted mower by means of the improved hitch connection, the two mowers being in normal offset operating position;

Figure 2 is a plan view illustrating in full lines the two mowers in the positions they assume after the tractor-mounted mower has turned the corner of a field and the trailing mower is at the point of wheeling around into its new position and resuming its normal offset trailing relation to the tractor-mounted mower, and showing in dotted lines the position of the tractor-mounted mower with respect to the draft bar of the trailing mower when a turn is partially completed;

Figure 3 is an enlarged detail plan view of the trailing mower, and illustrating the improved means for connecting the hitch device thereto;

Figure 4 is an enlarged perspective view of the means employed for connecting the draft bar of the hitch connection to the frame of the tractor-mounted mower; and Figure 5 is a perspective view, on an enlarged scale, of a part of the trailing mower, and illustrating the stop member for the draft tongue.

Referring to the drawings, the leading or tractor-mounted mower is indicated as an entirety by the numeral 5, and only such parts thereof as are necessary to an understanding of the present invention will be described herein. As shown, the mower 5 includes a framework 6, having its rear end supported by a caster wheel 7 and its forward end connected by a universal joint 8 to a transverse frame bar 9 bolted to a U-shaped draft member 11 that is rigidly fixed to the draft frame 12 of a tractor 14 that is fragmentarily indicated by dotted lines. Extending laterally from the right hand side of the framework 6 and suitably secured thereto is the usual cutter bar mechanism indicated as an entirety by the numeral 15. The right hand forward corner of the frame 6 is supported on the transverse bar 9 by means including a latch 16 which is adapted to release when the cutter bar 15 of the mower 5 strikes an obstruction to thereby allow the mower frame 6 and the cutter bar 15 to swing rearwardly about the vertical pivot 19 of the universal joint connection 8. It is believed that the above description of the tractor-mounted mower 5 is sufficient for the purposes of the present application, but if desired reference may be had to Patent No. 1,946,541, issued February 13, 1934, to Nolan D. Colvin and myself for a complete showing and description of a tractor-supported mower of the type with which the present invention is concerned.

The trailing mower is indicated as an entirety by the reference numeral 21, and includes a suitable supporting framework 22 supported on laterally spaced carrying wheels 23, and the usual laterally extending cutter bar mechanism indicated as an entirety by 24. The trailing mower 21 is connected to the leading mower in offset relation thereto by means including a draft member 25 comprising a forward portion 26 extending laterally across the tractor-mounted mower and a rearwardly and laterally extending portion 27 formed integral with the portion 26. This draft member 25 is preferably, although not necessarily, in the form of a length of pipe having its forward end portion 26 disposed parallel to the transverse draft bar 9 of the leading mower, said pipe being bent adjacent the right hand end of the draft bar 9, as shown in Figure 1, to provide the rearwardly and laterally extending portion 27 above mentioned. The rear end of the draft member 25 is supported by a caster wheel 28 which is connected thereto in any suitable manner. As best shown in Figure 4, the forward end of the pipe draft member 25 is pivotally connected to the transverse draft bar 9 by means of a pin 31 that is welded or otherwise suitably secured to the end of the pipe 25, as shown at 32, and the pin 31 extends through a hole in a vertically extending lug or bracket 33 that is welded or otherwise suitably secured to and extends upwardly from a transverse bar 34 bolted, as shown at 35, to the upper side of the transverse draft bar 9. A cotter pin 36 inserted through a hole in the pin 31 on the outer side of the lug 33 acts to hold the pin in the lug. The draft pipe 25 is also pivotally connected to the bar 34 at a point spaced laterally from the pivot pin 31 and adjacent to the bend in said pipe, and this second pivotal connection comprises a lug or bracket 38 welded as shown at 39 to the pipe 25 and pivotally connected by a bolt or pivot pin 41 to a bracket or lug 42 welded or otherwise suitably secured to the bar 34 and extending upwardly therefrom. By providing this pivotal connection between the draft member 25 and the draft bar 9, the draft member is free to swing vertically, whereby provision is made for the caster wheel 28 to rise and fall relative to the mower frame 6 as it travels over the surface of the ground. To provide additional stiffness and strength, a reenforcing member 45 is welded as shown at 46 in Figure 4 to the pipe 25 at the bend therein.

The trailing mower 21 is connected to the rear end of the draft member 25 by means of a draft tongue 51 connected at its rear end to the frame 22 of the mower 21 by means of a vertically extending pivot pin or bolt 53 which provides for swinging movement of the tongue 51 in a horizontal plane. The forward end of the draft tongue 51 is coupled to the rear end of the draft member 25 by means of a suitable spring release device 54 the purpose of which will be hereinafter pointed out. As the present invention is not particularly concerned with the spring release device per se, and any appropriate release device may be used, such device will not be particularly described herein. It may be well to point out, however, that the spring release device employed is similar to the one illustrated and described in Patent No. 1,975,237, issued October 2, 1934, to Talbert W. Paul, and reference may be had to that patent if desired.

Forward of the pivotal connection 53 of the draft tongue 51 with the trailing mower 21, the draft tongue is slidably supported on the mower for lateral movement by a clip 55 welded or otherwise suitably secured to the tongue. As best shown in Figure 3, the clip 55 slidably engages an arcuate shaped support 56 that is connected at its opposite ends to the upper ends of brackets 57 and 58 the lower ends of which are rigidly attached to the mower frame 22. The bracket 57 also serves as a stop device for limiting movement of the draft tongue 51 as it swings toward the right when the tractor makes a right turn, as will be pointed out later herein.

In normal operation, that is to say when the two mowers are traveling in a straight line as illustrated in Figure 1, the trailing mower 21 is held in proper angular position with respect to the draft tongue 51 by means of a chain 60 and a spring 61 that are connected in series relation with each other between a lug or angle bracket 62 bolted as shown at 63 to the tongue 51 and a lug or bracket 64 bolted as shown at 65 to the right hand end of the arcuate support 56. The spring 61 is comparatively stiff so that during normal operation it is not stretched, but when the cutter bar 24 strikes an obstruction, the spring will stretch so as to allow the cutter bar 24 and the mower frame 22 to swing in a clockwise direction about the draft tongue pivot 53 until the obstruction is cleared, at which time the spring 61 exerts a pressure to return the mower frame 22 and cutter bar 24 to their normal operating positions. If the obstruction is such however that it does not readily clear itself upon swinging of the frame 22 and cutter bar 24 about the pivot connection 53, the draft tongue 51 of the trailing mower will be disconnected from the draft member or pipe 25 by the action of the spring release device 54 above referred to.

A spring 71 is connected at one end to an eyebolt 72 that is secured in any one of several holes 73 in an angle member 74 welded or otherwise rigidly secured to the upper side of the draft tongue 51 between the pivot 53 and the arcuate member 56, and at its opposite end the spring 71 engages a hook 75 fixed in one of several holes 76 provided in a bar or member 77 rigidly fixed, as by means of a bolt 78, to the left hand end of the arcuate support 56, as best shown in Figure 3, and the purpose of this spring will now be described.

When it is desired to make a right turn from the position shown in Figure 1 toward the position shown in Figure 2 the tractor is swung abruptly at right angles about the inside rear wheel, the rear end of the draft frame 5 swinging to the left. This movement of the front unit causes the cutter bar 15 of the tractor-mounted mower and also the draft member 27 to swing in a clockwise direction and at the same time moves the rear draw-bar 51 forwardly and to the left as shown by dotted lines in Figure 2, thereby causing the rear mower to finish cutting its swath as it moves somewhat diagonally to the left away from the standing grain. The tractor and tractor-mounted implement by this time are moving forwardly toward the right in the new direction, as shown in full lines in Figure 2, causing the draft tongue 51 of the trailing implement 21 to swing toward the right about its pivot connection 53 with the trailing mower frame until it encounters the stop bracket 57. This swinging movement of the draft tongue 51 stretches the spring 71, and such spring is so designed that the tension set up in the spring by such movement is not sufficient in itself to swing the mower about the pivot 33 in a clockwise direction. However, during the continued forward travel of the tractor when the tongue 51 strikes the stop 57, by virtue of the direction of travel of the tractor, which has now turned so that its line of travel is transverse to that of the trailing mower 21, the mower will be given an initial impulse by the draft tongue to swing bodily in a clockwise direction, and after the turning movement has thus been initiated by the tongue 51 the spring 71 will exert a force to quickly pull the left hand side of the mower forwardly to thereby swing the mower about its pivot connection 53 with the draft tongue 51, the spring 71 continuing to function in this manner until the mower has swung around into its new position at right angles to its former position, at which point the swinging of the mower about the pivot 53 is stopped by the action of the chain 60 and spring 61.

It is, of course, evident from the above described construction that it is necessary to carefully balance the tension of the spring 71 so that the mower will not begin to swing until the tongue 51 strikes the stop 57 but so that the mower will be swung quickly around into its new position by the spring 71 after the turning movement of the mower has once been started, and such tension in the spring can be very accurately adjusted by adjusting the position of the hook 75 along the member 76. Also, the angle at which the spring 71 acts on the tongue 51 can be adjusted by moving the eye-bolt 72 into one or another of the holes 73 in the angle member 74, as will be readily appreciated.

The cutter bar 24 of the trailing mower can be raised and lowered from the tractor by means of a rope 81 connected to an operating lever 82 suitably mounted on the frame 22 of the mower, said rope extending over a pulley 83 fixed to the outer end of a beam 84 extending rearwardly from the mower frame 22 and over a second pulley 85 mounted on a pulley support 86 that is fastened in any suitable manner to the hitch device 54 at the forward end of the draft tongue 51. The cutter bar 24 can be tilted fore and aft by means of a hand lever 87 supported in any suitable manner on the mower frame 22 and suitably connected with the cutter bar through a link 88.

While I prefer to use my improved hitch connection with mowing machines as illustrated in the drawings and above described, it is to be understood that, within its broader aspects, the invention is also adaptable to the operation of other implements, which may include corn harvesters, reapers and possibly grain combines.

I claim:

1. A hitch connection adapted to connect a working implement in offset relation behind a pulling vehicle, said hitch connection comprising a draft tongue pivotally connected for lateral movement to said pulling vehicle, means pivotally connecting the rear end of said draft tongue for lateral movement about a point on said implement, a stop for limiting the lateral swinging movement of said draft tongue in one direction when moved in that direction by the turning of the pulling vehicle, spring means connected between said draft tongue and said implement and biased when the draft tongue swings toward said stop, the strength of said spring means being insufficient to overcome the inertia of said working implement to start the latter moving when the draft tongue is swung laterally, the strength of said spring means being sufficient to continue the swinging movement of the implement after the draft tongue strikes said stop and initially strikes the movement of said implement, and a second spring means connected between said draft tongue and the implement for limiting the swinging of said implement about said pivotal connection in the other direction but permitting swinging of said implement about said pivotal connection beyond said limit in said other direction when said implement strikes an obstruction.

2. A hitch connection as defined in claim 1, wherein means is provided for adjusting the tension of said first spring means.

3. A hitch connection for a working implement adapted to be drawn in offset relation behind a pulling vehicle, said hitch connection including a draft tongue pivotally connected for lateral swinging movement about a point on said implement, means comprising a pair of opposed spring means for yieldably holding said implement in proper angular position relative to said draft tongue but permitting lateral movement of said tongue and movement of said implement relative to said tongue in either direction out of such proper angular position when said implement strikes an obstruction, a fixed stop for limiting the lateral swinging movement of said draft tongue in one direction when moved in that direction by the turning of the pulling vehicle, one of said spring means being sufficiently stiff to limit the swinging movement of the draft tongue in a direction away from said stop under the influence of the other spring means, the latter having less strength than said one spring means and connected between said draft tongue and said implement for swinging said implement relative to the draft tongue about its pivotal connection with the latter when the draft tongue strikes said stop, and initiate movement of the implement relative to the draft tongue, said first spring means limiting the swinging movement of the implement relative to the draft tongue under the influence of said second spring means.

4. The combination of a tractor-mounted implement having a frame pivotally connected with the tractor for generally vertical swinging movement about a transverse axis and extending rearwardly therefrom, a caster wheel supporting the rear end of said frame, a trailing implement adapted to be drawn in offset relation behind the tractor-mounted implement, a hitch connection including a draft member comprising a transversely extending section pivotally connected with the tractor-mounted implement for generally vertical movement relative to the frame thereof about an axis substantially coinciding with said transverse axis and an integral second section extending laterally and rearwardly from said transverse section, a caster wheel supporting the rear end of said second section, said second caster wheel being spaced laterally from said first caster wheel, a draft tongue connected at its forward end with the rear end of said second section and its rear end pivotally connected with the trailing implement for lateral swinging movement relative thereto, and means biased by the swinging of the draft tongue when turning the first implement relative to the trailing implement for swinging the latter into its new position behind the first implement.

5. A draft member for connecting a trailing implement with a tractor-mounted implement having a rearwardly extending frame whereby the trailing implement is drawn in offset relation behind the tractor mounted implement, comprising a first section extending transversely of the tractor-mounted implement to a point at one side of the frame thereof, a second section extending laterally and rearwardly therefrom at one side of said frame, means pivotally connecting said second section to the trailing implement, and transversely extending pivot means connecting said first section to the tractor-mounted implement whereby said draft member may swing vertically relative to and alongside the frame of said tractor-mounted implement.

6. A draft member for connecting a tractor-mounted implement with a trailing implement whereby the latter is drawn in offset relation behind the tractor-mounted implement, comprising a generally L-shaped bar having one section extending transversely of the tractor-mounted implement and a second section extending laterally and rearwardly alongside and laterally outwardly of said tractor-mounted implement, whereby the latter may rise and fall without interference with said draft member, means pivotally connecting said second section to the trailing implement, means pivotally connecting the free end of said first section to the tractor mounted implement, and means disposed adjacent the junction of said first and second sections for pivotally connecting said draft member to the tractor mounted implement at a point spaced laterally from said first mentioned pivotal connecting means.

7. A draft member for connecting a tractor-mounted implement with a trailing implement whereby the latter is drawn in offset relation behind the tractor-mounted implement, comprising a first section extending transversely of the tractor-mounted implement and a second section extending laterally and rearwardly from said first section, means pivotally connecting said second section to the trailing implement, and transversely extending pivot means connecting said first section to the tractor mounted implement whereby said draft member may swing vertically relative to the latter, said pivot means including a pivot pin fixed to the end of said section and extending through an opening in a bracket connected to the tractor-mounted implement, and a bracket fixed to said section at a point spaced laterally from said pivot pin and pivotally connected to a second bracket connected to said tractor mounted implement.

8. A tractor hitch for connecting a tractor-mounted implement and a trailing implement to a tractor whereby the trailing implement will be drawn in offset relation behind the tractor-mounted implement, said tractor hitch comprising a transversely extending bar connected with the tractor and pivotally connected at two laterally spaced points to the tractor-mounted implement, a member bent intermediate its ends to provide a front transversely extending section and a rear section extending laterally therefrom, means pivotally connecting said front transverse section to said bar at transversely disposed points between the points of pivotal connection of the tractor mounted implement for vertical swinging movement relative to the latter, and means pivotally connecting the rear section to said trailing implement.

9. In a mower including a cutter bar adapted to be drawn in offset relation behind a pulling vehicle, a hitch connection between said mower and the vehicle including a draft tongue pivotally connected for lateral swinging movement about a point on said mower, a pair of opposing springs for holding said mower and cutter bar in proper angular position relative to said draft tongue but permitting swinging of said mower and cutter bar relative to said tongue about said pivot connection out of said proper angular position when said cutter bar or when the mower wheel at the side of the mower opposite the cutter bar strikes an obstruction, one of said springs being stronger than the other and serving to hold the cutter bar in normal operating position, the other spring yielding when the draft tongue is swung about its pivot toward the cutter bar relative to the mower, means for adjusting the tension exerted by said second spring, and additional means for adjusting the point of connection of said second spring to the draft tongue toward or away from the pivot of the latter.

10. In a mower including a cutter bar adapted to be drawn in offset relation behind a pulling vehicle, a hitch connection between said mower and the vehicle, comprising a draft tongue pivotally connected for lateral swinging movement about a point on said mower, means for holding said mower and cutter bar in proper angular position relative to said draft tongue but permitting lateral swinging of said mower and cutter bar in one direction relative to said tongue about said pivot connection out of said proper angular position when said cutter bar strikes an obstruction, said holding means acting to return said mower to proper angular position when moved out of such position, a stop for limiting the lateral swinging movement of said draft tongue in the other direction when moved in that direction by the turning of the pulling vehicle, and spring means connected between said draft tongue and said mower for swinging said mower in said one direction about its pivotal connection with the draft tongue when the latter strikes said stop, said holding means limiting the swinging movement of said mower about said pivotal connection under the action of said spring means beyond a predetermined point.

11. In a mower having a frame, a draft tongue pivoted thereto for generally horizontal swinging movement, spring means connected to said draft tongue and said frame at one side of said pivot and acting to swing the draft tongue in one direction with respect to the mower frame, and a second spring means connected to said tongue and the mower frame at the opposite side of said pivot, said second spring means being stronger than said first spring means and arranged to serve as a limit for movement of the mower frame relative to the draft tongue under the influence of said first spring means.

12. In a mower, a frame, a draft tongue pivoted thereto for generally horizontal swinging movement, a positive stop limiting the swinging movement of said mower frame in one direction about said pivot, spring means connected between the draft tongue and the mower frame and acting to swing said frame relative to said draft tongue in a direction to carry said positive stop towards said draft tongue, said spring means being limited in its action after said draft tongue is in an intermediate position away from said positive stop, and a second spring means connected with the draft tongue and with the mower frame at the opposite side of the pivot, said second spring means being capable of turning said frame relative to said draft tongue after the frame has been given an initial movement by the engagement of said draft tongue with said positive stop.

13. Hitch means for connecting a tractor-mounted implement with a trailing implement whereby the latter is drawn in offset relation behind the tractor-mounted implement, said hitch means comprising a pair of laterally spaced brackets connected with the tractor-mounted implement, a draft member extending laterally and rearwardly from the tractor-mounted implement, means pivotally connecting said trailing implement with said member, pivot means at the forward end of said member extending through an opening in one of said brackets, a lug fixed to said member laterally of said pivot means, and means pivotally connecting said lug with said other bracket.

14. Hitch means for connecting a tractor-mounted implement and a trailing implement to a tractor, whereby the trailing implement is drawn in offset relation behind the tractor-mounted implement, said hitch means comprising a transverse bar adapted to be fixed to the draw bar of the tractor, pivot means connecting the tractor-mounted implement thereto for generally vertical swinging movement, a generally L-shaped draft member, one portion of the L-shaped member being disposed adjacent said bar and the other portion extending rearwardly and laterally outwardly alongside the tractor-mounted implement, means connecting the rear end of said second portion of said L-shaped member to the trailing implement, and means including a member secured to said bar for pivotally connecting the first portion of said L-shaped member to said bar.

WILBUR J. COULTAS.